(12) United States Patent
Kim

(10) Patent No.: US 7,178,774 B2
(45) Date of Patent: Feb. 20, 2007

(54) MOUNT APPARATUS FOR IMAGE DISPLAYING DEVICE

(75) Inventor: Tae Hyung Kim, Youngju-si (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 11/009,555

(22) Filed: Dec. 13, 2004

(65) Prior Publication Data

US 2005/0127253 A1    Jun. 16, 2005

(30) Foreign Application Priority Data

Dec. 12, 2003   (KR) ...................... 10-2003-0090701

(51) Int. Cl.
*E04G 3/00* (2006.01)
(52) U.S. Cl. .................................. 248/279.1; 248/922
(58) Field of Classification Search ............. 248/274.1, 248/276.1, 282.1, 283.1, 284.1, 285.1, 286.1, 248/287.1, 917, 919, 920, 921, 923, 480, 248/976

See application file for complete search history.

(56) References Cited

U.S. PATENT DOCUMENTS 6,905,101 B1 *   6/2005   Dittmer ................... 248/274.1

FOREIGN PATENT DOCUMENTS

WO    WO 03/036950    *   5/2006

* cited by examiner

*Primary Examiner*—Ramon O Ramirez
(74) *Attorney, Agent, or Firm*—Fleshner & Kim, LLP

(57) ABSTRACT

A mount apparatus for an image displaying device is provided. The apparatus includes: a set engaging unit engaged to a rear surface of the image displaying device; a fixing unit fixed to a fixed surface; an upper connecting unit engaged with an upper portion of the set engaging unit to vertically rotate with respect to the upper portion of the set engaging unit, and slidably engaged to the fixing unit, thereby vertically rotating with respect to the upper portion of the set engaging unit depending on an up and down control of the image displaying device while varying an interval between the upper portion of the set engaging unit and the fixing unit; and a lower connecting unit for connecting a lower portion of the set engaging unit with the fixing unit and engaged with the lower portion of the set engaging unit to vertically rotate with respect to the lower portion of the set engaging unit.

25 Claims, 12 Drawing Sheets

MOUNT APPARATUS FOR IMAGE DISPLAYING DEVICE

BACKGROUND OF THE INVENTION

1. Field of the Invention

The present invention relates to a mount apparatus for an image displaying device, and more particularly, to a mount apparatus for an image displaying device in which a flat-type image displaying device can be mounted at a fixed surface such as a wall and can be easily controlled in angle.

2. Description of the Related Art

Recently, a demand for a large-sized image displaying device such as a plasma display panel TV or a liquid crystal display TV is being rapidly increased.

Such an image displaying device has an advantage of a small thickness, a lightweight and a large-sized screen in comparison to a cathode ray tube displaying device according to the related art.

Specifically, a flat-type image displaying device has an advantage in that it can be mounted at a fixed surface such as a wall surface to maximize a utilization of space. Accordingly, a variety of mount apparatuses for mounting the flat-type image displaying device at the fixed surface such as the wall surface are appearing in the market.

FIGS. 1 to 3 are views illustrating a related-art mount apparatus for an image displaying device.

FIG. 1 illustrates a fixing bracket fixed to a wall surface to mount the image displaying device, and FIG. 2 illustrates an article bracket engaged at one side to a rear surface of the image displaying device and engaged at the other side to the fixing bracket. Additionally, FIG. 3 illustrates a state in which the image displaying device is mounted at the wall surface.

As shown, the fixing bracket 1 with a bilateral symmetric structure has a fixing hole 3 for fixing the fixing bracket 1 to the wall surface 7, and an engaging unit 2 for engaging the article bracket 4 with the fixing hole 3.

The fixing bracket 1 is firmly fixed to the wall surface or the fixed surface through the fixing hole 3.

Meanwhile, the article bracket 4 is screwed to the rear surface of the image displaying device 6 through an engagement hole 5.

If the article bracket 4 is engaged to the engaging unit 2 of the fixing bracket 1 in a state where the image displaying device is engaged with the article bracket 4, the image displaying device 6 is fixed to the wall surface 7 as shown in FIG. 3.

However, the mount apparatus cannot freely control the image displaying device in a viewer's desired direction since it just merely fixes the image displaying device to the wall surface.

For example, when it is intended to control the image displaying device in all directions in the state where the image displaying device is fixed to the wall surface, the mount apparatus cannot perform such an operation.

SUMMARY OF THE INVENTION

Accordingly, the present invention is directed to a mount apparatus for an image displaying device that substantially obviates one or more problems due to limitations and disadvantages of the related art.

An object of the present invention is to provide a mount apparatus for an image displaying device in which the image displaying device can be mounted at a fixed surface and can be freely controlled in direction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a mount apparatus for an image displaying device, the apparatus including: a set engaging unit engaged to a rear surface of the image displaying device; a fixing unit fixed to a fixed surface; an upper connecting unit engaged with an upper portion of the set engaging unit to vertically rotate with respect to the upper portion of the set engaging unit, and slidably engaged to the fixing unit, thereby vertically rotating with respect to the upper portion of the set engaging unit depending on an up and down control of the image displaying device while varying an interval between the upper portion of the set engaging unit and the fixing unit; and a lower connecting unit for connecting a lower portion of the set engaging unit with the fixing unit and engaged with the lower portion of the set engaging unit to vertically rotate with respect to the lower portion of the set engaging unit.

In another aspect of the present invention, there is provided a mount apparatus for an image displaying device, the apparatus including: a set engaging unit having a set engaging member engaged to a rear surface of the image displaying device, a first connecting unit provided at an upper portion of the set engaging member, and a second connecting unit provided at a lower portion of the set engaging member; a fixing unit having a guide member horizontally having a rail and fixed to a fixed surface, and a fixing member being provided at a lower side of the guide member and fixed to the fixed surface; an upper connecting unit having a first upper connecting member engaged with the first connecting unit to vertically rotate with respect to the first connecting unit, a second upper connecting member and a third upper connecting member engaged with the first upper connecting member to horizontally rotate with respect to the first upper connecting member, and a sliding member engaged with the second upper connecting member and the third upper connecting member to horizontally rotate with respect to the second upper connecting member and the third upper connecting member, and slidably engaged with the rail; and a lower connecting unit having a first lower connecting unit engaged with the second connecting unit to vertically rotate with respect to the second connecting unit, and a second lower connecting unit engaged with the first lower connecting member to rotate with respect to the first lower connecting member and engaged with the fixing member to horizontally rotate with respect to the fixing member.

In a further another aspect of the present invention, there is provided a mount apparatus for an image displaying device, the apparatus including: a set engaging unit engaged with the image displaying device; a fixing unit fixed to a fixed surface; and a connecting unit for connecting upper and lower portions of the set engaging unit with the fixing unit, and varying an interval between the upper portion of the set engaging unit and the fixing unit and an interval between the lower portion of the set engaging unit and the fixing unit to vary an angle of the set engaging unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
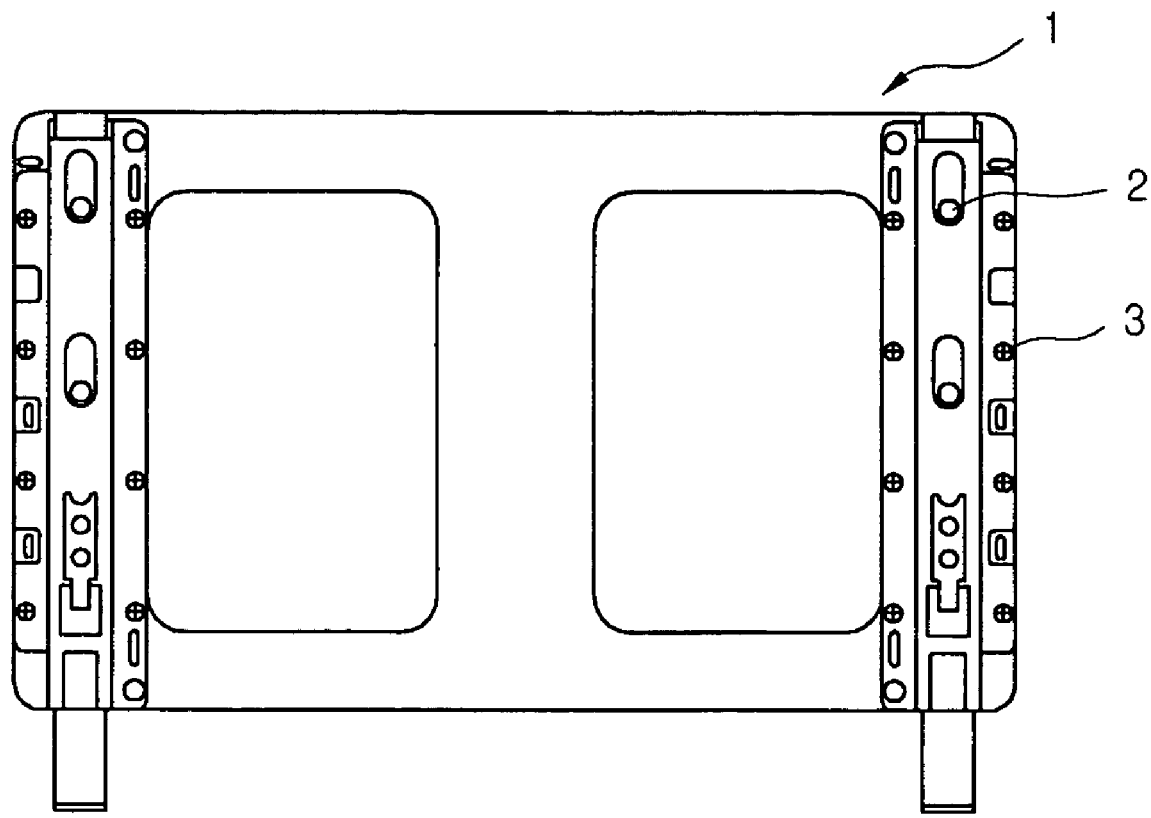
FIG. 1 is a view illustrating a fixed bracket fixed to a wall surface to mount an image displaying device.
Figure 2:
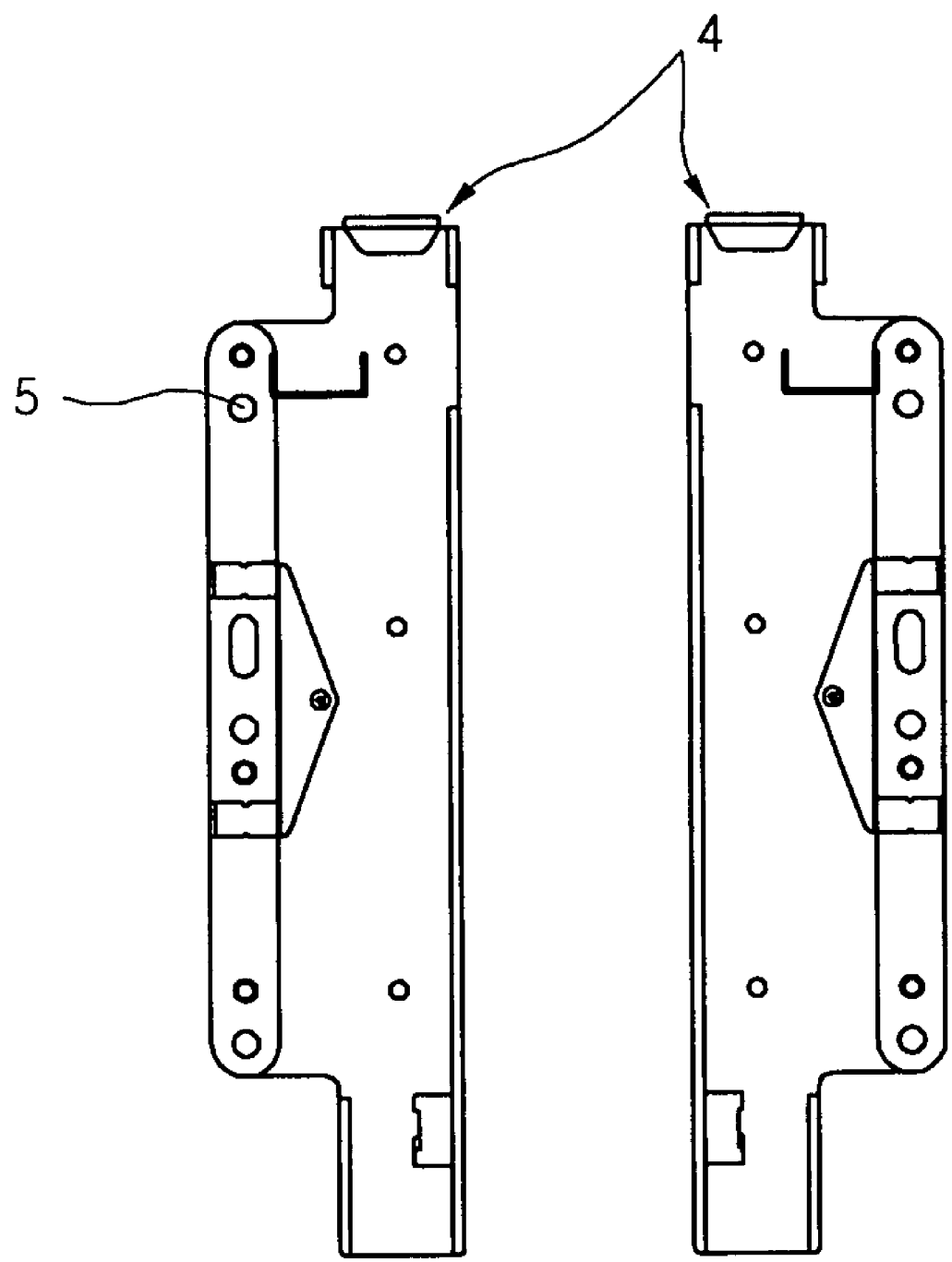
FIG. 2 is a view illustrating an article bracket fixed at one side to a rear surface of an image displaying device and engaged at the other side to a fixed bracket.
Figure 3:
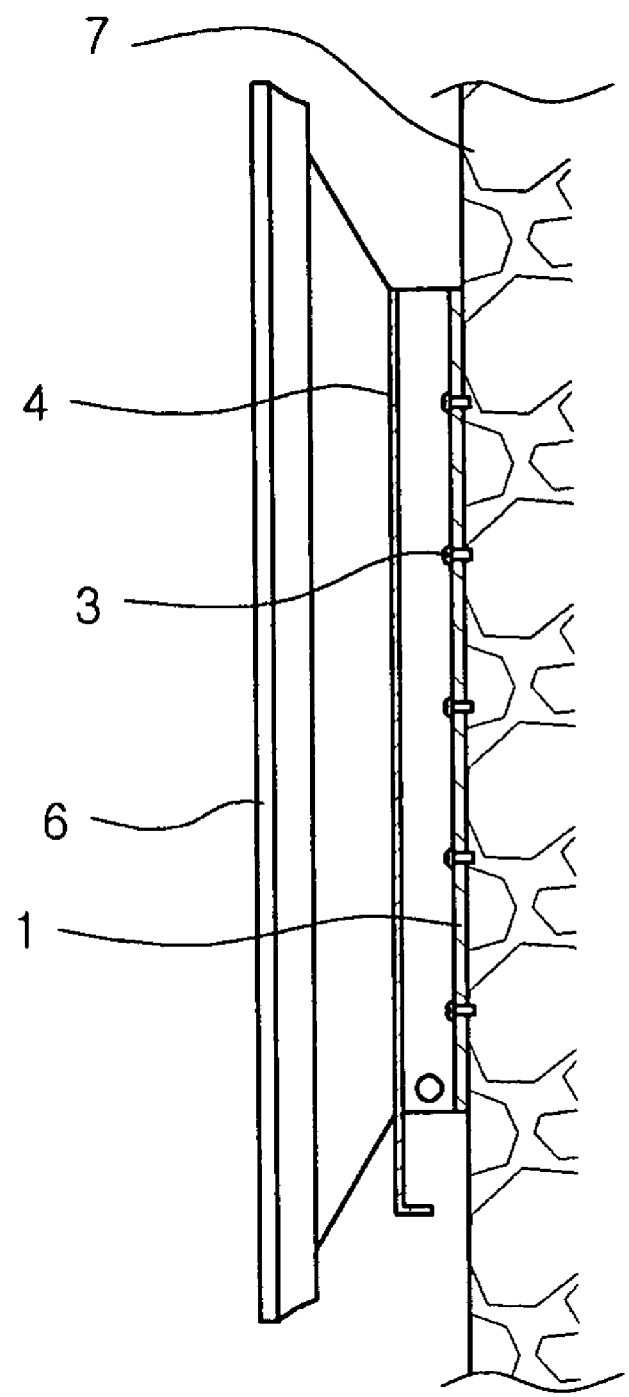
FIG. 3 is a view illustrating a state in which an image displaying device is mounted at a wall surface.
Figure 4:
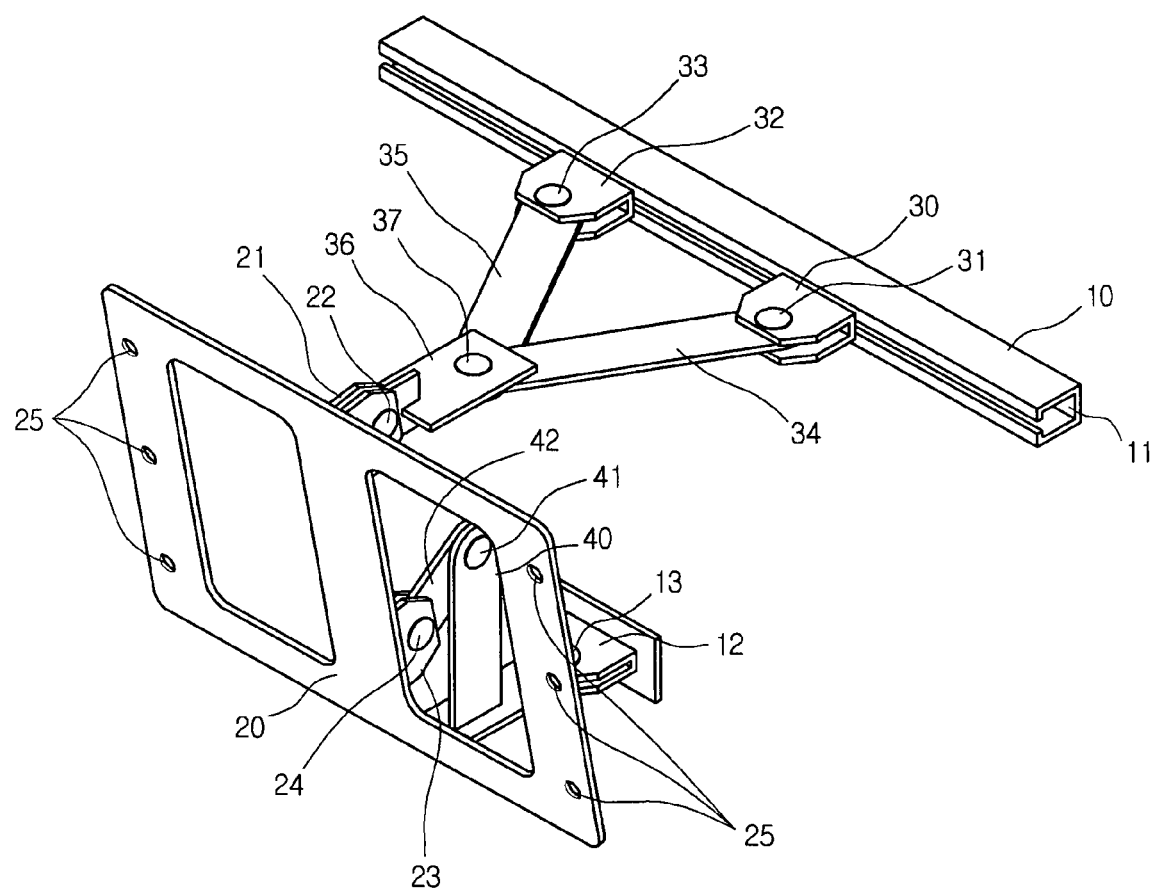
FIG. 4 is a perspective view illustrating a mount apparatus for an image displaying device according to the present invention.

FIG. 4 is a perspective view illustrating a mount apparatus for an image displaying device according to the present invention.

The mount apparatus includes a set engaging unit engaged to a rear surface of the image displaying device; and a fixing unit engaged and fixed to a fixed surface such as a wall surface; and a connecting unit for connecting the set engaging unit with the fixing unit and vertically and horizontally controlling the image displaying device engaged to the set engaging unit.

Figure 6:
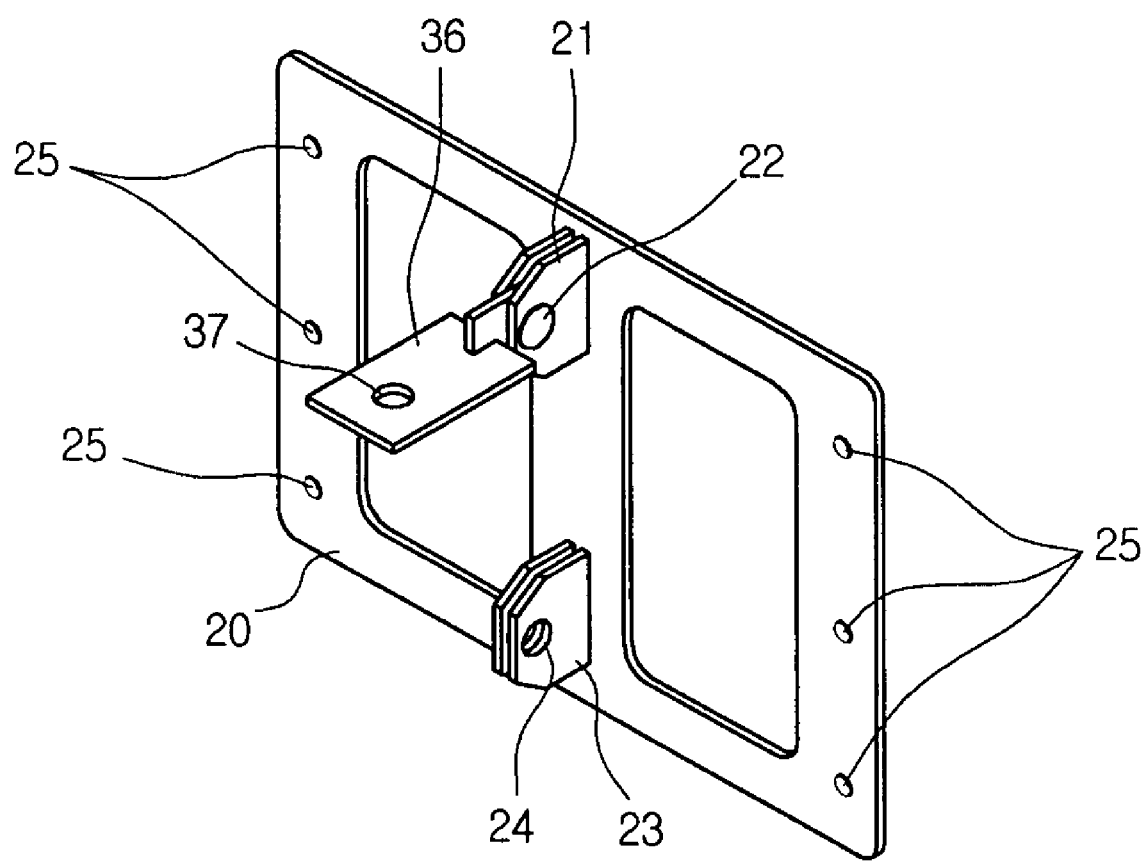
FIG. 6 is a view illustrating a set engaging unit of a mount apparatus for an image displaying device according to the present invention.

First, as shown in FIG. 6, the set engaging unit includes a set engaging member 20; a first connecting unit 21 provided at a rear upper portion of the set engaging member 20; and a second connecting unit 23 provided at a rear lower portion of the set engaging member 20.

Figure 7:
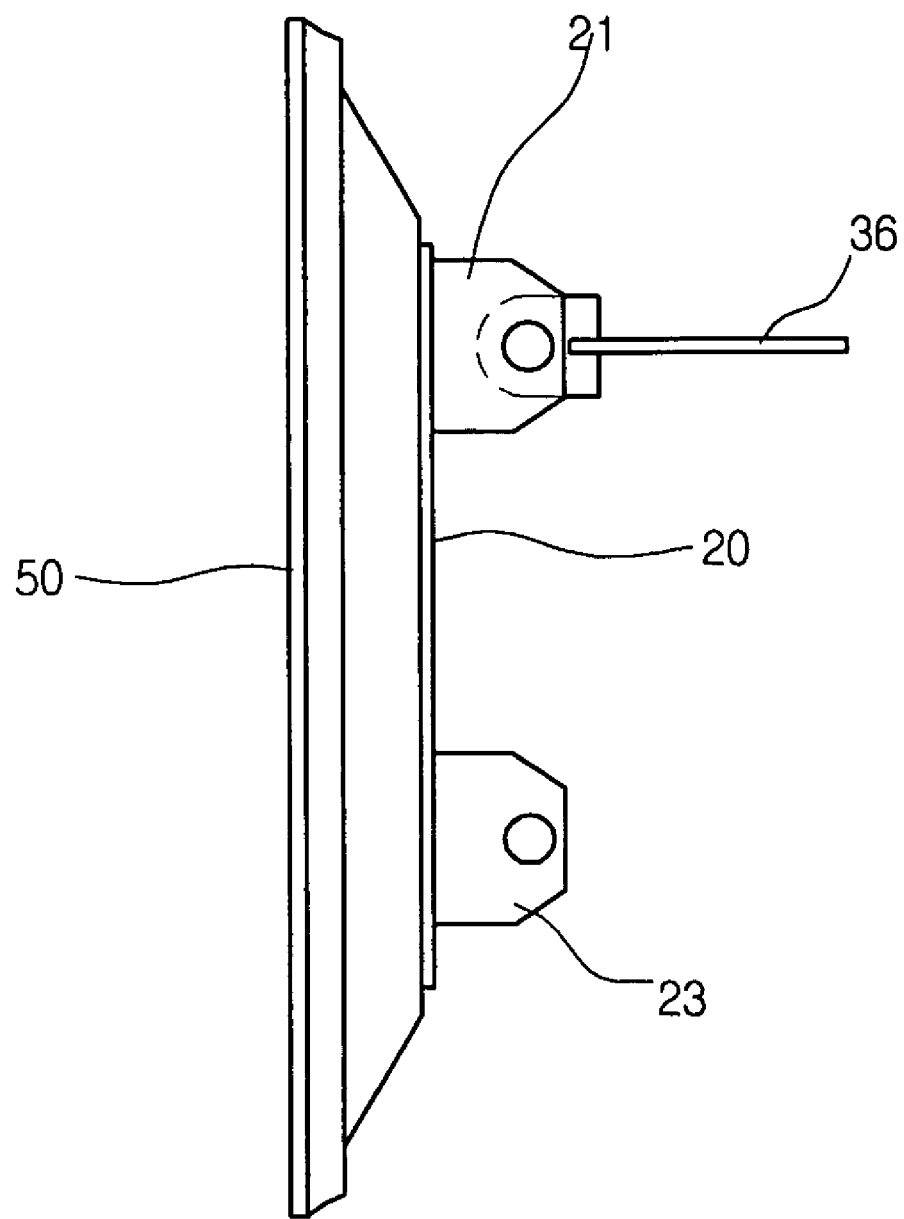
FIG. 7 is a side view illustrating an image displaying device and a set engaging unit engaged with each other at a mount apparatus for the image displaying device according to the present invention.

As shown in FIG. 7, the set engaging member 20 is engaged with a rear surface of the image displaying device 50. The set engaging member 20 can be screwed through its plurality of screw holes 25 with the rear surface of the image displaying device 50, and can be also engaged with the rear surface with the image displaying device 50 by using other units.

The first connecting unit 21 is engaged with the connecting unit through a hinge 22 to vertically rotate with respect to the connecting unit, and the second connecting unit 23 is engaged with the connecting unit through a hinge 24 to vertically rotate with the connecting unit.

The fixing unit includes a guide member 10 horizontally having a rail 11; and a fixing member 12 disposed at a lower side of the guide member 10.

Figure 5:
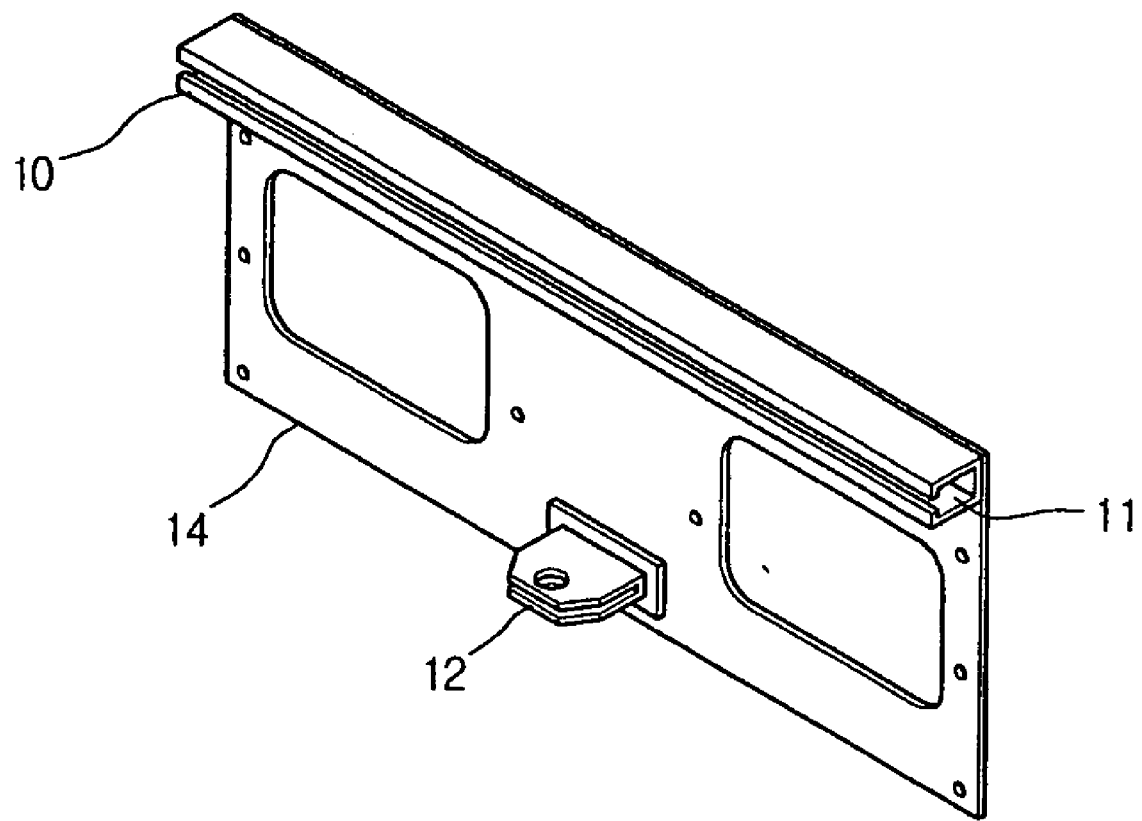
FIG. 5 is a view illustrating a fixing unit of a mount apparatus for an image displaying device according to the present invention.

The guide member 10 and the fixing member 12 can be separated and fixed to the fixed surface. As shown in FIG. 5, the guide member 10 and the fixing member 12 can be adhered to a fixing plate 14 to be fixed to the fixed surface.

The fixing plate 14 has a plurality of through-holes to be screwed and firmly fixed to the fixed surface.

The connecting unit includes a lower connecting unit for connecting the second connecting unit 23, which is provided at the rear lower portion of the set engaging member 20, with the fixing member 12; and an upper connecting unit for connecting the first connecting unit 21, which is provided at the rear upper portion of the set engaging member 20, with the guide member 10.

First, the lower connecting unit includes a first lower connecting member 42 engaged with the second connecting unit 23 to vertically rotate with respect to the second connecting unit 23; and a second lower connecting member 40 engaged with the first lower connecting member 42 to vertically rotate with the first lower connecting member 42, and engaged with the fixing member 12 to horizontally rotate with respect to the fixing member 12.

The second connecting unit 23, the first lower connecting member 42, the second lower connecting member 40, and the fixing member 12 are rotatably engaged with one another using hinges 13, 24 and 41.

The upper connecting unit includes a first upper connecting member 36 engaged with the first connecting unit 21 to vertically rotate with respect to the first connecting unit 21; and a second upper connecting member 34 and a third upper connecting member 35 engaged with the first upper connecting member 36 to horizontally rotate with respect to the first upper connecting member 36. The second upper connecting member 34 and the third upper connecting member 35 are engaged with the first sliding member 30 and the second sliding member 32 to horizontally rotate with respect to the first sliding member 30 and the second sliding member 32. Each of the first sliding member 30 and the second sliding member is slidably engaged to the guide member 10.

The first connecting unit 21, the first upper connecting member 36, the second upper connecting member 34 and the third upper connecting member 35 are rotatably engaged with one another using hinges 22, 31, 33 and 37.

FIG. 6 is a view illustrating the set engaging unit of the mount apparatus according to the present invention, and FIG. 7 is a side view illustrating the image displaying device and the set engaging unit engaged with each other at the mount apparatus according to the present invention.

As described above, the image displaying device 50 is engaged at its rear surface to the set engaging member 20 to be fixed to the fixed surface through the connecting unit and the fixing unit.

Figure 8:
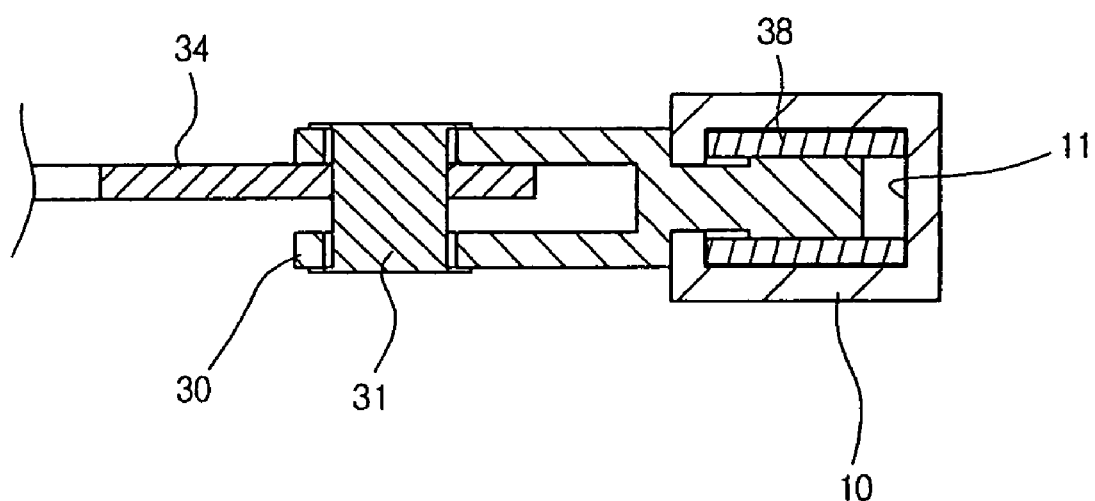
FIG. 8 is a view illustrating a state in which a guide member is engaged with a sliding member in a mount apparatus for an image displaying device according to the present invention.

FIG. 8 is a view illustrating a state in which the guide member 10 is engaged with the first sliding member 30 in the mount apparatus for the image displaying device according to the present invention.

A portion of the first sliding member 30 is inserted inside of the guide member 10 such that the first sliding member 30 is engaged to the guide member 10. More preferably, the first sliding member 30 has a roller 38 to allow the first sliding member 30 to be engaged with and slide along a rail 11 provided inside of the guide member 10.

The second sling member 32 also has a roller (not shown) to allow the second sling member 32 to be engaged with and slide along the rail 11 provided inside of the guide member 10.

Figure 9:
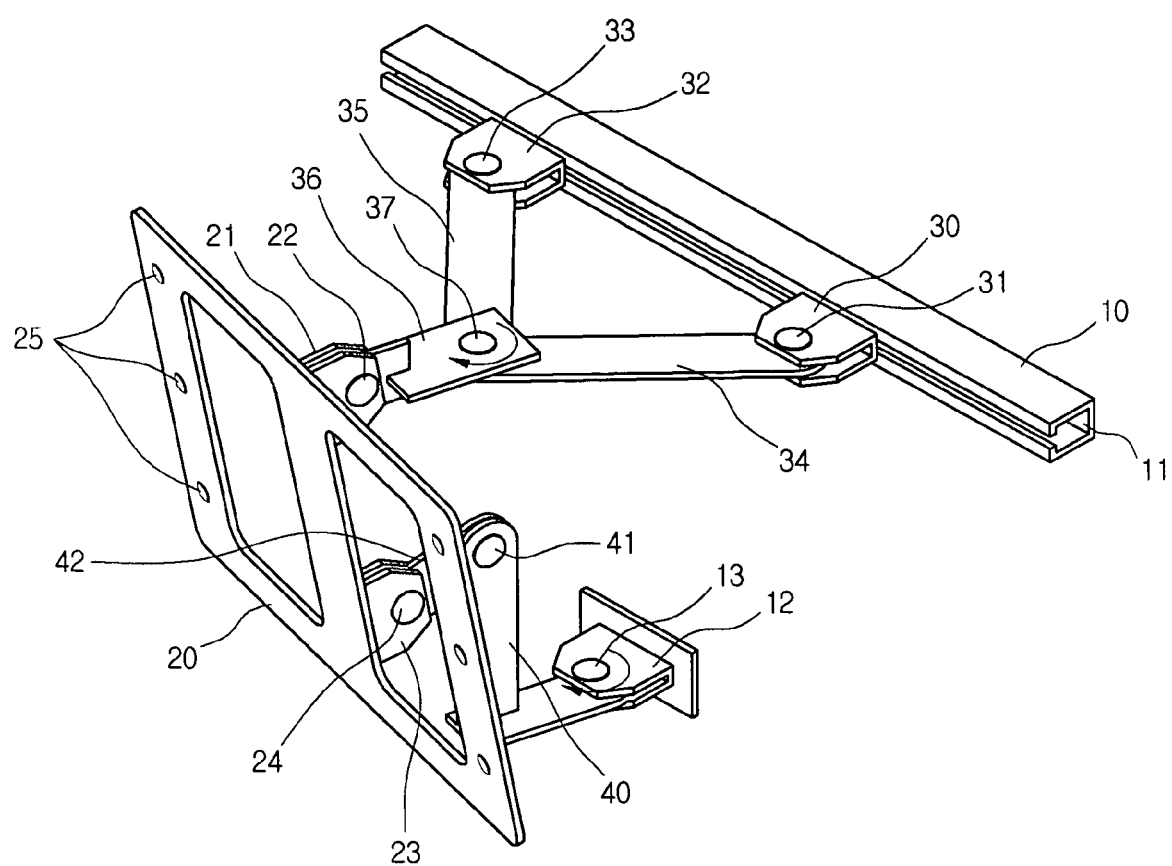
FIGS. 9 and 10 are views illustrating cases where an image displaying device is controlled to move left and right on a mount apparatus for an image displaying device according to the present invention.
Figure 10:
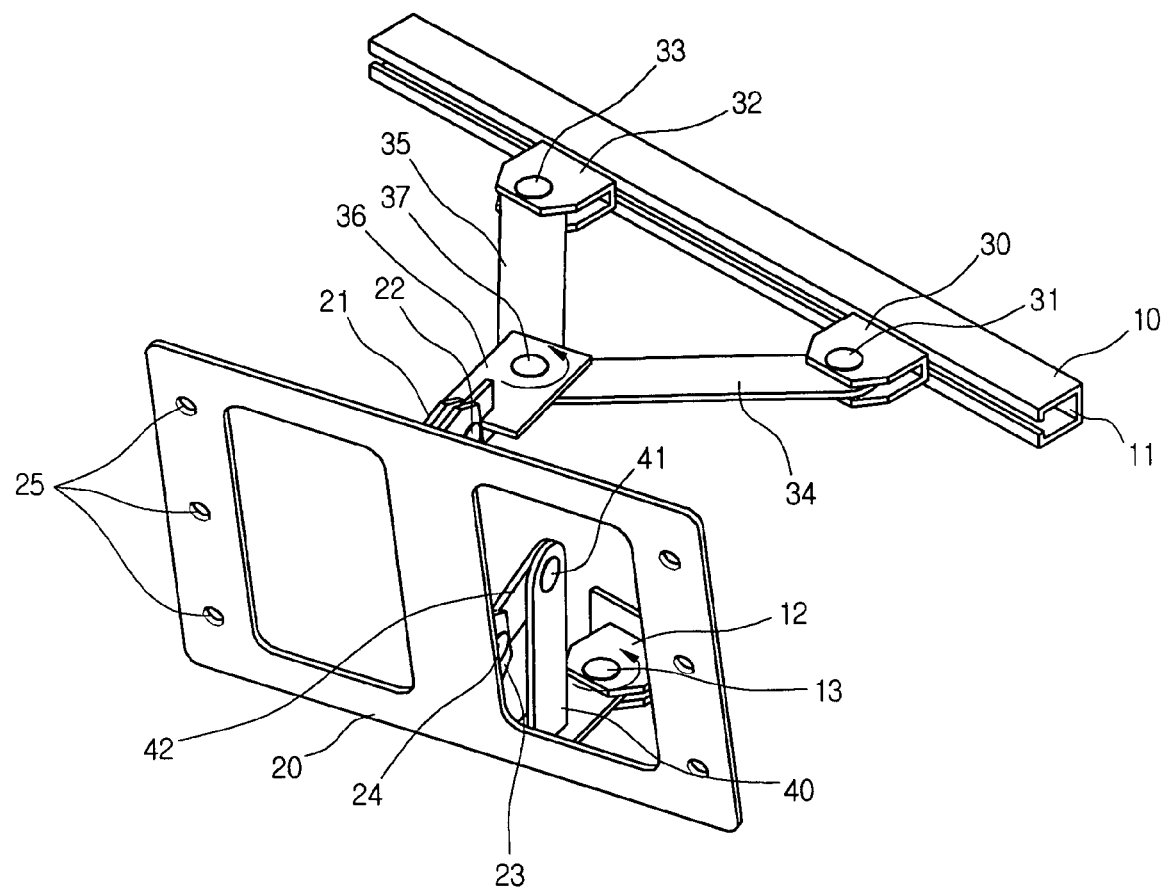
Figure 11:
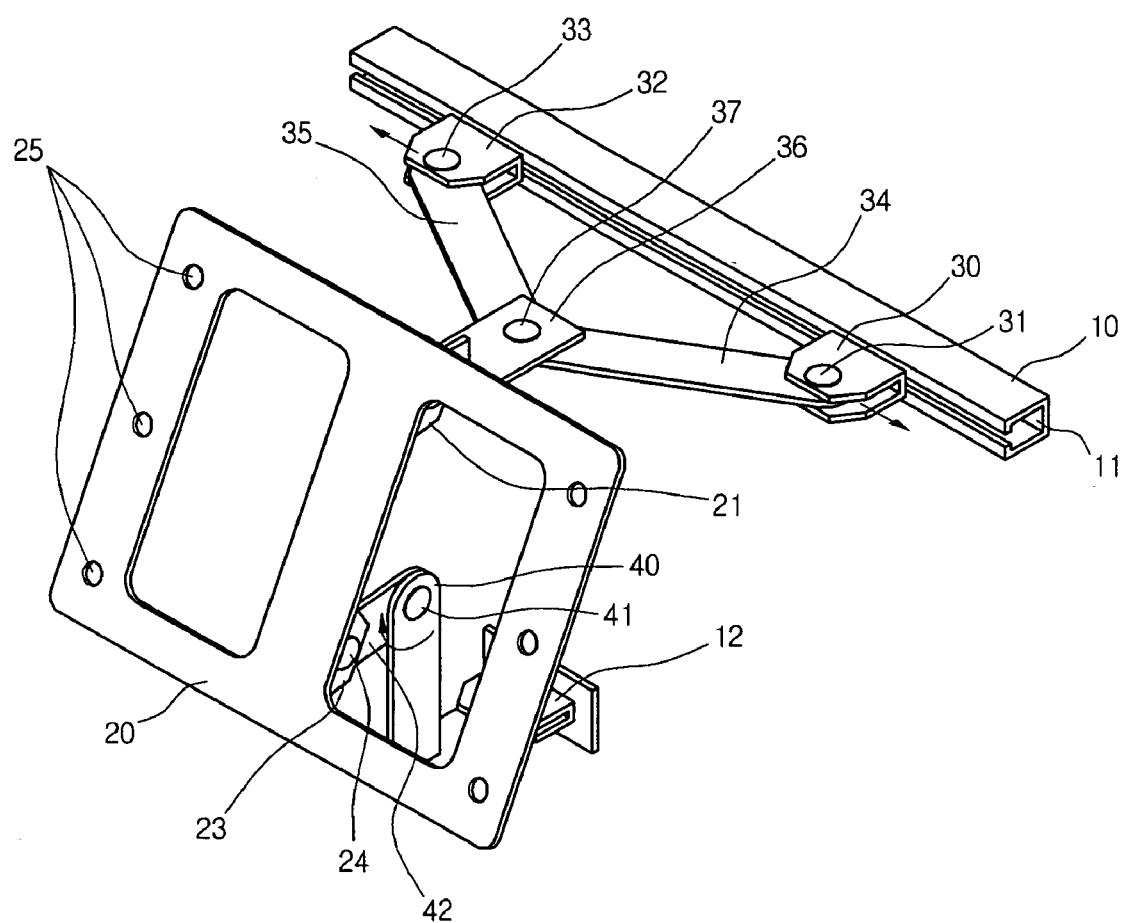
FIGS. 11 and 12 are views illustrating cases where an image displaying device is controlled to move up and down on a mount apparatus for an image displaying device according to the present invention.
Figure 12:
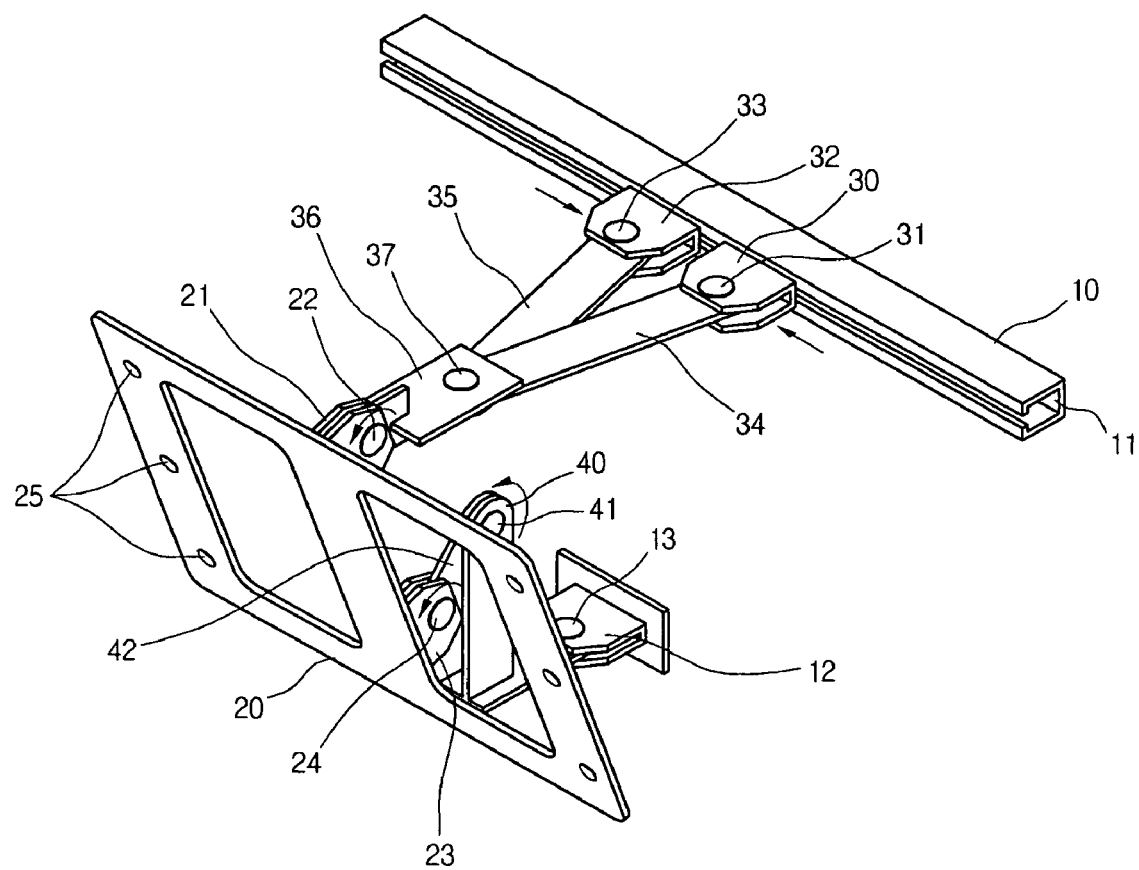

FIGS. 9 and 10 are views illustrating cases where the image displaying device is controlled to move left and right on the mount apparatus for the image displaying device according to the present invention, and FIGS. 11 and 12 are views illustrating cases where the image displaying device is controlled to move up and down on the mount apparatus for the image displaying device according to the present invention.

In the drawings, the image displaying device engaged with the set engaging member 20 is not illustrated to more apparently illustrate an operation state of the mount apparatus according to the present invention.

First, in case where a user applies a force to rotate the image displaying device or the set engaging member 20 to the left or right, the second lower connecting member 40 is rotated to the left or right of the fixing member 12.

At the same time, the first connecting unit 21 and the first upper connecting member 36 are rotated to the left or right with respect to the second upper connecting member 34 and the third upper connecting member 35.

Meanwhile, in case where the user applies the force to rotate the image displaying device or the set engaging member 20 up and down, the first sliding member 30 and the second sliding member 32, which are connected with the first connecting unit 21, are slid at the guide member 10 to become more distant or close to each other.

For example, as shown in FIG. 11, in case where the set engaging member 20 is rotated upward, the first sliding member 30 and the second sliding member 32 become more distant from each other while the set engaging member 20 becomes close at the upper portion to the guide member 10.

To the contrary, as shown in FIG. 12, in case where the set engaging member 20 is rotated downward, the first sliding member 30 and the second sliding member 32 become more close to each other while the set engaging member 20 becomes more distant at the upper portion from the guide member 10.

At the same time, the second connecting unit 23 is rotated to the up or down of the first lower connecting member 42. Further, depending on a degree of the up or down rotation of the set engaging member 20, the first lower connecting member 42 is rotated to the up or down of the second lower connecting member 40.

Through the above operation, the mount apparatus according to the present invention can freely control the image displaying device in all directions.

Alternatively, washers and the like are inserted into connecting portions with the hinges 22, 24, 31, 33, 37 and 41 to provide an abrasion force such that the connecting portions can be rotated by a user's force.

Accordingly, the image displaying device can be mounted at the fixed surface, and can be controlled in all directions for a user's convenience.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A mount apparatus for an image displaying device, the apparatus comprising:
    a set engaging unit configured to be engaged to a rear surface of an image displaying device;
    a fixing unit configured to be fixed to a fixed surface;
    an upper connecting unit configured to be engaged with an upper portion of the set engaging unit so as to vertically rotate with respect to the upper portion of the set engaging unit, and to be slidably engaged to the fixing unit so as to rotate vertically with respect to the upper portion of the set engaging unit based on an upward and downward orientation of the set engaging unit while varying an interval between the upper portion of the set engaging unit and the fixing unit; and
    a lower connecting unit configured to connect a lower portion of the set engaging unit with the fixing unit, and to be engaged with the lower portion of the set engaging unit so as to vertically rotate with respect to the lower portion of the set engaging unit.

2. The apparatus according to claim 1, wherein the set engaging unit comprises:
    a set engaging member configured to be engaged with a rear surface of an image displaying device;
    a first connecting unit disposed at the upper portion of the set engaging member and configured to be engaged with the upper connecting unit so as to vertically rotate with respect to the upper connecting unit; and
    a second connecting unit disposed at the lower portion of the set engaging member and configured to be engaged with the lower connecting unit so as to vertically rotate with respect to the lower connecting unit.

3. The apparatus according to claim 1, wherein the set engaging unit is configured to be screwed to the rear surface of the image displaying device.

4. The apparatus according to claim 1, wherein the upper connecting unit comprises:
    a first upper connecting member configured to be engaged with the set engaging unit so as to vertically rotate with respect to the set engaging unit;
    a second upper connecting member and a third upper connecting member each configured to be engaged with the first upper connecting member so as to horizontally rotate with respect to the first upper connecting member; and
    a sliding member configured to be engaged with the second upper connecting member and the third upper connecting member so as to horizontally rotate with respect to the second upper connecting member and the third upper connecting member, and slidably to be engaged to the fixing unit.

5. The apparatus according to claim 1, wherein the lower connecting unit comprises:
    a first lower connecting member configured to be engaged with the set engaging unit so as to vertically rotate with respect to the set engaging unit; and a second lower connecting member configured to be engaged with the first lower connecting unit so as to vertically rotate with respect to the first lower connecting unit, and to be engaged to the fixing unit.

6. The apparatus according to claim 1, wherein the fixing unit comprises:
   a guide member having a rail configured to allow the upper connecting unit to slide; and
   a fixing member configured to be rotatably engaged with the lower connecting unit.

7. A mount apparatus for an image displaying device, the apparatus comprising:
   a set engaging unit having a set engaging member configured to be engaged to a rear surface of an image displaying device, a first connecting unit provided at an upper portion of the set engaging member, and a second connecting unit provided at a lower portion of the set engaging member;
   a fixing unit having a horizontally disposed guide member, the guide member having a rail formed therein, and a fixing member provided proximate a lower side of the guide member, wherein the guide member and the fixing member are each configured to be fixed to a fixed surface;
   an upper connecting unit having a first upper connecting member configured to be engaged with the first connecting unit so as to vertically rotate with respect to the first connecting unit, a second upper connecting member and a third upper connecting member each configured to be engaged with the first upper connecting member so as to horizontally rotate with respect to the first upper connecting member, and a sliding member configured to be engaged with the second upper connecting member and the third upper connecting member so as to horizontally rotate with respect to the second upper connecting member and the third upper connecting member, the sliding member being configured to be slidably engaged with the rail; and
   a lower connecting unit having a first lower connecting unit configured to be engaged with the second connecting unit so as to vertically rotate with respect to the second connecting unit, and a second lower connecting unit configured to be engaged with the first lower connecting member so as to rotate with respect to the first lower connecting member and to be engaged with the fixing member so as to horizontally rotate with respect to the fixing member.

8. The apparatus according to claim 7, wherein the fixing unit further comprises a fixing plate configured to be engaged with the guide member and the fixing member and to be fixed to the fixed surface.

9. The apparatus according to claim 7, wherein the sliding member has a roller configured to be engaged with the rail.

10. A mount apparatus for an image displaying device, the apparatus comprising:
    a set engaging unit configured to receive an image displaying device to be mounted to the mount apparatus;
    a fixing unit configured to be fixed to a mounting surface; and
    a connecting unit configured to connect upper and lower portions of the set engaging unit to respective upper and lower portions of the fixing unit, and to vary an interval between the upper portion of the set engaging unit and the fixing unit and an interval between the lower portion of the set engaging unit and the fixing unit so as to vary an angle of the set engaging unit.

11. The apparatus according to claim 10, wherein the set engaging unit and the fixing unit are configured to be connected by the connecting unit such that when the interval between the upper portion of the set engaging unit and the fixing unit is increased, the interval between the lower portion of the set engaging unit and the fixing unit is decreased, and such that when the interval between the upper portion of the set engaging unit and the fixing unit is decreased, the interval between the lower portion of the set engaging unit and the fixing unit is increased.

12. The apparatus according to claim 10, wherein the interval between the upper portion of the set engaging unit and the fixing unit varies based on a sliding operation of the connecting unit.

13. The apparatus according to claim 10, wherein the set engaging unit comprises:
    a set engaging member configured to be engaged with a rear surface of an image displaying device;
    a first connecting unit disposed at an upper portion of the set engaging member and configured to be engaged to the connecting unit; and
    a second connecting unit disposed at a lower portion of the set engaging member and configured to be engaged to the connecting unit.

14. The apparatus according to claim 10, wherein the connecting unit comprises:
    an upper connecting unit configured to connect the upper portion of the set engaging unit and the fixing unit; and
    a lower connecting unit configured to connect the lower portion of the set engaging unit with the fixing unit.

15. The apparatus according to claim 14, wherein the upper connecting unit comprises:
    a first upper connecting member configured to engage with the set engaging unit so as to vertically rotate with respect to the set engaging unit;
    a second upper connecting member and a third upper connecting member each configured to engage with the first upper connecting member so as to horizontally rotate with respect to the first upper connecting member; and
    a first sliding member and a second sliding member configured to engage with the second upper connecting member and the third upper connecting members, respectively, and to slidably engage the fixing unit.

16. The apparatus according to claim 15, wherein the first sliding member and the second sliding member each have at least one roller.

17. The apparatus according to claim 14, wherein the lower connecting unit comprises:
    a first lower connecting member configured to engage with the set engaging unit so as to vertically rotate with respect to the set engaging unit; and
    a second lower connecting member configured to engage with the first lower connecting member so as to vertically rotate with respect to the first lower connecting members, and to engage with the fixing unit so as to horizontally rotate with respect to the fixing unit.

18. The apparatus according to claim 10, wherein the fixing unit comprises:
    a guide member disposed horizontally and having a rail, wherein the guide member is configured to be slidably engaged with the connecting unit; and
    a fixing member disposed at a lower side of the guide member and configured to engage with the connecting unit.

19. The apparatus according to claim 18, wherein the guide member and the fixing member are provided with a fixing plate configured to be fixed to the mounting surface.

20. The apparatus according to claim 10, wherein the set engaging unit is configured to be screwed to a rear surface of an image displaying device to be mounted thereto.

21. A mount apparatus for a display device, comprising:
a set engaging unit configured to be attached to a display device;
a fixing unit configured to be fixed to a mounting surface; and
a connecting unit configured to couple the set engaging unit and the fixing unit so as to allow for rotation of the set engaging unit about a horizontal axis of rotation and a vertical axis of rotation relative to the fixing unit, wherein the connecting unit comprises:
an upper connecting unit configured to rotatably couple an upper portion of the set engaging unit to an upper portion of the fixing unit; and
a lower connecting unit configured to rotatably couple a lower portion of the set engaging unit to a lower portion of the fixing unit.

22. The apparatus of claim 21, wherein a first end of the upper connecting unit is configured to be rotatably coupled to the upper portion of the set engaging unit, and a second end of the upper connecting unit is configured to be slidably coupled to the upper portion of the fixing unit, and wherein a first end of the lower connecting unit is configured to be rotatably coupled to the lower portion of the set engaging unit so as to provide for rotation of the set engaging unit about the horizontal axis together with the slidable coupling of the second end of the upper connecting unit and the upper portion of the fixing unit, and a second end of the lower connecting unit is configured to be rotatably coupled to the lower portion of the fixing unit so as to provide for rotation of the set engaging unit about the vertical axis together with the rotatable coupling of the first end of the upper connecting unit and the upper portion of the fixing unit.

23. The apparatus of claim 21, wherein the upper connecting unit comprises:
a first upper connecting member configured to be rotatably coupled to the set engaging unit; and
a second upper connecting member and a third upper connecting member, each having a first end configured to be rotatably coupled to the first upper connecting member, and each having a second end configured to be rotatably coupled to a respective sliding member, wherein each sliding member is configured be slidably coupled to the upper portion of the fixing unit; and
wherein the lower connecting unit comprises:
a first lower connecting member; and
a second lower connecting member, wherein a first end of the first lower connecting member is rotatably coupled to the lower portion of the set engaging unit, a second end of the first lower connecting unit is rotatably coupled to a first end of the second lower connecting member, and a second end of the second lower connecting unit is rotatably coupled to the lower portion of the fixing member.

24. The apparatus of claim 23, wherein the set engaging unit comprises:
a set engaging member with a first side configured to be coupled to a display device;
a first connecting unit provided at an upper portion of a second side of the set engaging member opposite the first side and configured to be rotatably coupled to the first end of the first upper connecting member; and
a second connecting unit provided at a lower portion of the second side of the set engaging member opposite the first side and configured to be rotatably coupled to the first end of the first lower connecting member.

25. The apparatus of claim 24, wherein the fixing unit comprises:
a guide member having a rail configured to receive the sliding members so as to slidably couple the upper connecting unit to the upper portion of the fixing unit; and
a fixing member configured to be rotatably coupled to second end of the second lower connecting member so as to rotatably couple the lower connecting unit to the lower portion of the fixing unit.

* * * * *